July 1, 1969      A. ANWAY      3,452,440
SCRIBER GAUGE
Filed March 18, 1968
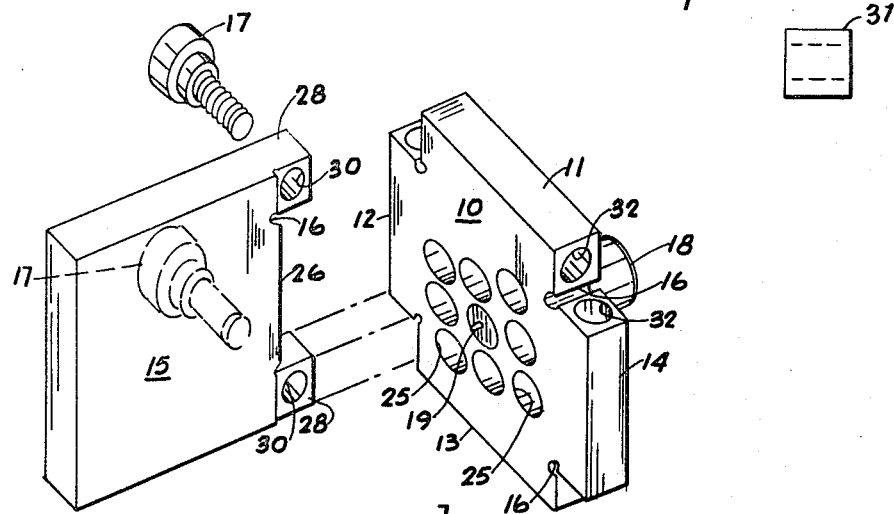
FIG.1    FIG.6
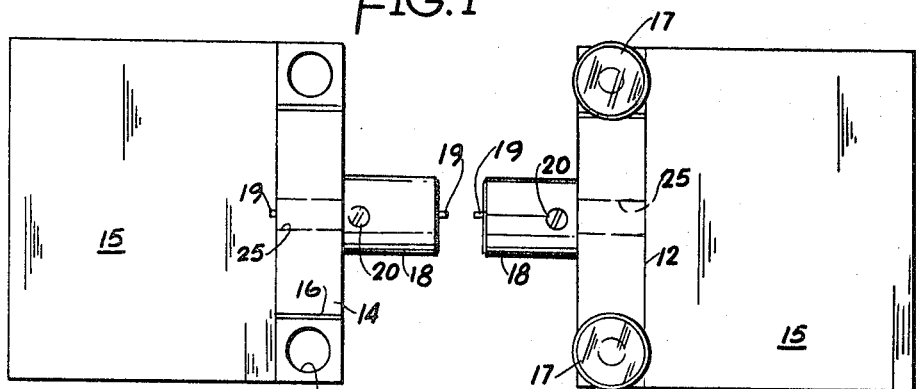
FIG.2    FIG.3
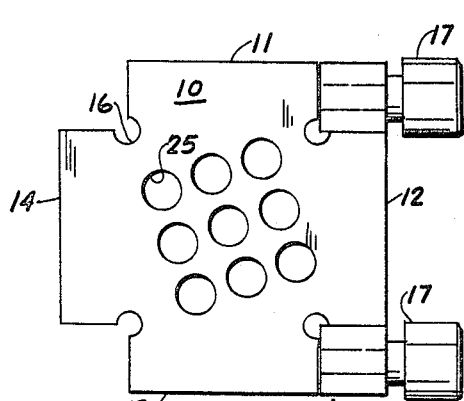 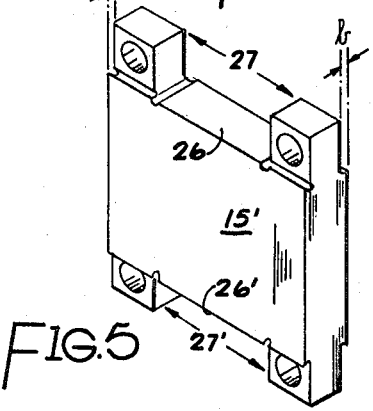
FIG.4    FIG.5
INVENTOR
ALLEN ANWAY

3,452,440
SCRIBER GAUGE
Allen Anway, Chicago, Ill.
(1012 Prospect Ave., Cloquet, Minn. 55720)
Filed Mar. 18, 1968, Ser. No. 713,577
Int. Cl. B43l 13/02
U.S. Cl. 33—42                              5 Claims

ABSTRACT OF THE DISCLOSURE

A scriber gauge which provides accurate scribing of straight lines on plane surfaces as determined by an edge, and is intended to replace or augment the hermaphrodite caliper in machine shop practice. The scriber gauge consists of two plane pieces held detachably together at right angles, one of the pieces having a plurality of holes into which a pointed piece can be removably disposed for the purpose of scribing lines.

Summary of the invention

The scriber gauge consists of four sections: a gauge, a back, an assembly screw (2 required); and a scriber, in which a pointed rod is held by a set screw. Indentations (of various sizes) are used as in standard practice to prevent clogging by chips. The gauge and back are plates which are secured together at a common edge and extend at right angles to each other. The gauge has a plurality of faces and inner holes.

To use the scriber gauge the worker selects the proper gauge and back and assembles the tool accordingly. Placing his piece on the inside right angle, he slides the piece or tool along the back and scriber to scribe a line.

The scriber gauge has the following advantages:

(1) Since this tool can be constructed to an accuracy of .001" without much expense, this tool is much more accurate than a hermaphrodite caliper and just as accurate as a milling machine for scribing.

(2) The accuracy of the setting does not depend on the skill of the machinist.

(3) The setting will not change in use as is possible with a hermaphrodite caliper.

(4) Skill is not required to hold the tool at right angles to the work as is necessary with a hermaphrodite caliper.

(5) By reversing the scriber, this tool is changed into a "go-no go" measuring gauge.

Brief description of the drawings

In the drawings:
FIG. 1 is a perspective exploded view of my invention;
FIG. 2 is a front view of my invention;
FIG. 3 is a rear view of my invention;
FIG. 4 is an end view of my invention showing the gauge; and
FIG. 5 is a view of the back as modified;
FIG. 6 shows an extension piece.

Detailed description of preferred embodiment

Referring now to FIGS. 1–4, a flat cruciform shaped gauge 10 has four mutually perpendicular faces 11, 12, 13 and 14 and nine spaced apart inner holes 25. Indentations 16 prevent clogging by chips.

A flat generally rectangular back 15 has three flat edges and a fourth edge 26 which has rectangular end pieces 28 with bores 30 separated by a gap in which any one of faces 11, 12, 13 and 14 can be disposed with gauge 10 and back 15 extending at right angles and held detachably together by assembly screws 17 which extend through bores 30 into threaded bores 32 at each end of the selected face. The scriber consists of a pointed rod 19 held by a set screw 20 in a holder 18 removably disposed in bores 25.

The tool illustrated will scribe thirty-six (four faces times nine holes) different dimensions from $\frac{1}{64}$ inch to $\frac{9}{16}$ inch in $\frac{1}{64}$ inch increments. From each face of the gauge the nine central holes progress by $\frac{1}{16}$ inch increments. However, the distance from the back to the center of the nearest hole is $\frac{1}{32}$ inch or $\frac{1}{16}$ inch or $\frac{3}{64}$ inch or $\frac{1}{64}$ inch depending upon whether this distance is measured to face 11 or face 12 or face 13 or face 14.

As indicated previously, to use my invention, the proper face and hole must be first selected and the tool assembled. The user can then place his piece or tool on the inside right angle and slide same along the back and scriber to scribe the line.

In FIG. 5, a modified back 15' with rectangular end pieces 27 and 27' can have two opposite measurements "a" at the top of the back and "b" at the bottom allowing four different increments of $\frac{1}{256}$ inch, $\frac{2}{256}$ inch, $\frac{3}{256}$ inch and $\frac{4}{256}$ inch. This arrangement then allows of 144 different measurements (4 times 4 times 9). Extension pieces 31 bored for assembly screws 17 may be placed between rectangular end pieces 30 and gauge 10 to change the measurement between the back 15 and the pointed rod 19.

The number of holes in the gauge can be readily increased for example to twenty-five, and the spacings can be varied to further increase the number of measurements and to decrease the increments therebetween. By using modifications of this type a continuum of measurements can be obtained as desired, and, with a table of set ups, a machinist can readily obtain any needed measurement of a line to be scribed.

While I have described my invention with particular reference to the drawings, such is not to be considered as limiting its actual scope.

Having thus described this invention, what is asserted as new is:

1. A scriber gauge comprising:
    a flat cruciform shaped gauge having four peripheral faces extending at right angles to each other, wherein said gauge is provided with a plurality of spaced apart holes extending transversely therethrough;
    a scriber removably disposed in said spaced apart holes;
    a flat rectangular shaped back having along at least one edge a cut out portion in which a selected one of the gauge faces can be disposed and the back and gauge extend at right angles to each other; and
    means to detachably secure said gauge and back to each other when any one gauge face is so disposed in the cut out portion of said back.

2. A scriber gauge as set forth in claim 1 including a scriber having a pointed rod removably disposed therein.

3. A scriber gauge as set forth in claim 2 wherein said means includes a pair of assembly screws.

4. A scriber gauge as set forth in claim 3 wherein said back has two opposite edges, each with said cut out portion, any one of said faces being disposable into either one of said cut out portions.

5. A scriber gauge as set forth in claim 4 having an extension piece between said back and said gauge to extend the range of measurement.

(References on following page)

References Cited

UNITED STATES PATENTS

| | | | |
|---|---|---|---|
| 2,886,891 | 5/1959 | Keller | 33—104 XR |
| 810,246 | 1/1906 | Anderson | 33—42 |
| 2,958,133 | 11/1960 | Seitz | 33—42 |

FOREIGN PATENTS

| | | |
|---|---|---|
| 612,294 | 7/1926 | France. |
| 846,922 | 8/1952 | Germany. |

HARRY N. HAROIAN, *Primary Examiner.*